United States Patent
Lal et al.

(10) Patent No.: US 12,308,764 B2
(45) Date of Patent: May 20, 2025

(54) TUBULAR HYDRO-VOLTAIC DEVICE

(71) Applicant: Amrita Vishwa Vidyapeetham, Tamil Nadu (IN)

(72) Inventors: Sujith Lal, Tamil Nadu (IN); Sudip Batabyal, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 167 days.

(21) Appl. No.: 18/311,584

(22) Filed: May 3, 2023

(65) Prior Publication Data

US 2024/0162839 A1    May 16, 2024

(51) Int. Cl.
*H02N 1/06*    (2006.01)
(52) U.S. Cl.
CPC ..................... *H02N 1/06* (2013.01)
(58) Field of Classification Search
CPC .......... H02N 1/06; H04R 23/00; H01G 11/08; H01G 11/04; H01G 11/00; H01G 11/78
USPC ........................................................ 310/300
See application file for complete search history.

(56) References Cited

U.S. PATENT DOCUMENTS

| | | | | |
|---|---|---|---|---|
| 669,149 | A * | 3/1901 | Crehore et al. | G01R 22/02 324/94 |
| 7,361,430 | B1 * | 4/2008 | Gennett | B81B 3/0021 977/932 |
| 8,093,628 | B2 * | 1/2012 | Yang | H01L 21/02472 257/E21.108 |
| 9,559,617 | B2 * | 1/2017 | Landa | H02N 11/002 |
| 2009/0243428 | A1 * | 10/2009 | Qiao | H02N 11/002 977/832 |
| 2021/0344286 | A1 * | 11/2021 | Yao | H02N 1/08 |
| 2022/0190226 | A1 * | 6/2022 | Yu | H10N 10/856 |

FOREIGN PATENT DOCUMENTS

| | | | | |
|---|---|---|---|---|
| CN | 110980851 A | * | 4/2020 | ............. C02F 1/14 |
| CN | 112963812 A | * | 6/2021 | ............. F22B 1/00 |
| CN | 113675001 A | * | 11/2021 | ............. H01G 11/08 |
| CN | 114314719 | * | 4/2022 | ............. C02F 1/04 |

* cited by examiner

*Primary Examiner* — Burton S Mullins
(74) *Attorney, Agent, or Firm* — Donald R. Boys; Central Coast Patent Agengy LLC

(57) ABSTRACT

The invention discloses a tubular hydro-voltaic device configured to generate voltage and current. The device includes a tubular structure containing activated porous carbon of predetermined thickness and length. The tubular structure is placed in a reservoir of fluid whereby the contact between the tubular structure and fluid produces a capillary action of the fluid into the tubular structure forming an electric double layer at carbon particle-water interfaces of the activated porous carbon material leading to voltage and current generation. The voltage and current generated by the tubular hydro-voltaic device are a function of the thickness of the tubular structure, the length of the tubular structure, or a combination thereof. The device has potential to provide power at remote locations, as a device of size 50 mm length×10 mm diameter×1.5 mm thickness is capable of generating mA level currents at 0.85 V or more.

9 Claims, 8 Drawing Sheets

TUBULAR HYDRO-VOLTAIC DEVICE

CROSS REFERENCE TO RELATED DOCUMENTS

The present invention claims priority to Indian application 202241065079 Filed Nov. 14, 2022. All disclosure of the parent application is incorporated at least by reference.

FIELD OF INVENTION

The present disclosure relates to electricity generating devices based on physical phenomena, and in particular to hydro-voltaic devices.

DESCRIPTION OF THE RELATED ART

More than 80% of power generated around the world is dependent on fossil fuels such as oil, natural gas, and coal. Exploitation of fossil fuels for power generation has serious implications in terms of climate change hence current research trends in the area of power generations look at generating green energy. There are various methods of generating green energy and one among them would be to generate power using the "hydro voltaic effect," wherein energy is generated due to the movement of fluids without the need for complex systems or any natural resources.

Hydro voltaic devices can generate potential and current that can be collected when the fluid interacts with any functional group gradient substrate when the fluid flows over a carbon surface via evaporation or capillary action.

Chinese patent application CN112963812A discloses a water evaporation and power generation integrated system based on carbon nanotubes and thermoelectricity and application. The Chinese patent application CN114314719A discloses a composite evaporation rod based on interface evaporation and its application. The evaporation rod includes a light-to-heat conversion layer and a water supply layer, and the light to-heat conversion layer wraps the water supply layer.

Chinese patent CN110980851A describes a seawater evaporation water-taking power generation device and water taking power generation method based on solar energy. In the device, a fresh water tank hermetically communicates with a seawater tank through a water collecting flow channel, and the water collecting flow channel is higher than the seawater surface and the fresh water surface; a cation exchange membrane comprises a semiconductor film main body for generating a photoelectric Poisson effect, nanoparticles arranged on the first side, facing a high-transmittance flat plate, of the semiconductor film main body, and a capillary water delivery conduit for delivering seawater from the second side to the first side.

Researchers have developed various designs of hydro voltaic devices which generate power wherein such devices have provided high voltage values but the current produced is in the range of few µA.

Accordingly, there is a need for a hydro voltaic device for power generation generating high voltage values and current values.

A tubular structure containing activated carbon (TAC) is disclosed that is capable of generating voltage and current.

SUMMARY OF THE INVENTION

In various embodiments a hydro-voltaic device configured to generate voltage and current is disclosed. The hydro-voltaic device includes a tubular structure of predetermined thickness, predetermined diameter and predetermined length made of activated carbon (TAC). The tubular structure has a top end and a bottom end. A first electrode 121 is affixed to the top end and a second electrode 122 to the bottom end. The bottom end is inserted in a reservoir of water. Capillary action is configured to cause formation of an electric double layer (110) is formed at the carbon particle-water interfaces. The device is configured to generate voltage and current flow between the first electrode 121 and the second electrode 122.

In some embodiments, the hydro-voltaic device (100) has predetermined dimensions of length 30-80 mm×tubular diameter 8-15 mm×thickness of 1-2 mm. In some embodiments of the device 100, the predetermined length is 50±2 mm, or the predetermined diameter is 10±0.5 mm, or the predetermined thickness is 1.5+−0.2 mm. In some embodiments, the device is configured to generate enhanced voltage on optical irradiation. In some embodiments, wherein the generated voltage of the device is in a range 0.6 V to 1 V. In some embodiments, the tubular structure comprises activated carbon with porosity in the size range 2 and 20 nm.

In various embodiments, the invention discloses a method (200) of generating voltage and current in a hydro-voltaic device. The method comprises providing (202) a tubular hollow structure predetermined dimensions of length 30-80 mm×tubular diameter 8-15 mm×thickness of 1-2 mm comprising activated carbon. The structure may have electrodes at either end thereof. The method involves placing the tubular structure in a reservoir (204) comprising water and allowing the water to flow through the tubular structure by capillary action (206). The method is configured to form an electric double layer (EDL) (208) at carbon particle-water interfaces, thereby generating voltage and causing flow of current across the ends of the tubular structure.

In some embodiments, the method may comprise the step of exposing the device to a light source to enhance the voltage generated. In some embodiments, the method may comprise maintaining an acidic pH of the water, thereby enhancing the voltage and current drawn from the device.

This, and other aspects are disclosed herein.

BRIEF DESCRIPTION OF THE DRAWINGS

The invention has other advantages and features, which will be more readily apparent from the following detailed description of the invention and the appended claims, when taken in conjunction with the accompanying drawings, in which:

DETAILED DESCRIPTION OF THE EMBODIMENTS

Figure 1A:
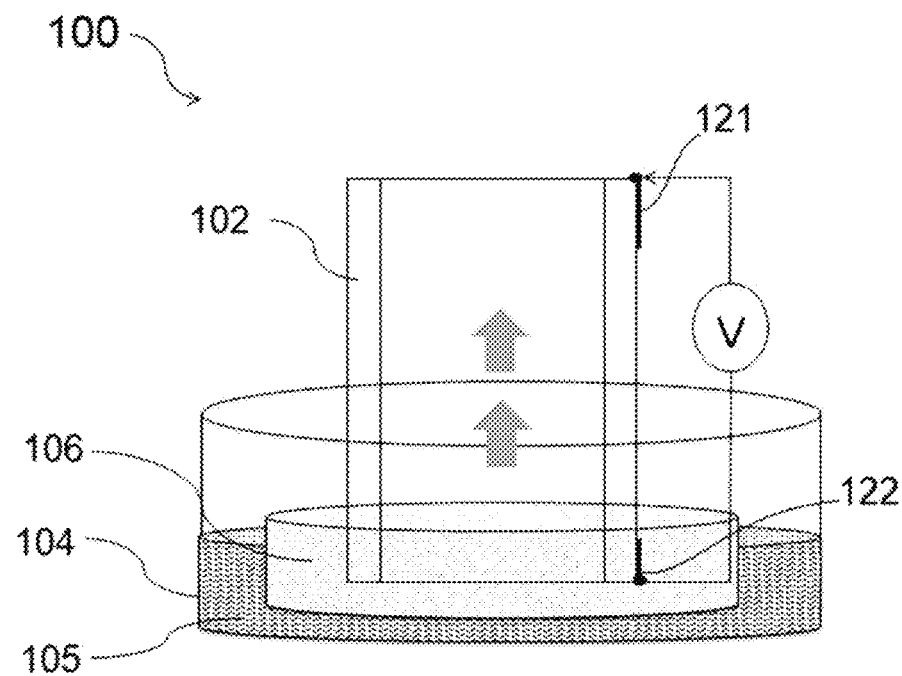
FIG. 1A illustrates the structure of a tubular hydro-voltaic device according to embodiments of the invention.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present subject matter discloses a tubular hydro-voltaic device containing a tubular structure of activated carbon (TAC) immersed in a reservoir of fluid. High voltage and high current are produced under ambient temperature. No external energy such as light, heat, or wind is used to generate the voltage or current. The generation of voltage or current is based on the capillary flow of fluid and varies with the thickness of the tubular structure. In various embodiments an electric double layer (EDL) is formed due to the interaction of carbon with the fluid, i.e. at the at carbon particle-water interfaces. In various embodiments, a method of generating voltage and current in the hydro-voltaic device is disclosed.

In various embodiments, a tubular hydro-voltaic device 100 as shown in FIG. 1A is disclosed. The device includes a tubular structure 102 formed of activated carbon immersed in a reservoir 104 of fluid 105. The tubular structure has a top end and a bottom end, the top end having a first electrode 121 and the bottom end having a second electrode 122 affixed thereon. The device produces high voltage and high current under ambient temperature without any external energy such as light, heat, or wind, between the electrodes 121 and 122. The production of voltage and current is attributed to the interaction of the porous tubular structure with the fluid. In various embodiments, immersing the tubular hydro-voltaic device 100 in the reservoir of fluid 104 allows capillary flow of fluid 105 and hence the interaction of carbon with the fluid. In some embodiments the capillary interaction of the fluid with the tubular structure of activated carbon and evaporation and phase change are believed to cause a potential across the tubular structure. In various embodiments the fluid may be water or other polar fluid. In some embodiments, the water may be acidified and have a pH in the range 3-7. In some embodiments, the increased concentration of H+ ions in acidified water may be configured to increase the voltage or current generated, or both.

In various embodiments the tubular structure 102 has a predetermined thickness and length. The capillary flow of water and hence the potential is configured to vary with the thickness of the tubular structure 102.

Figure 1B:
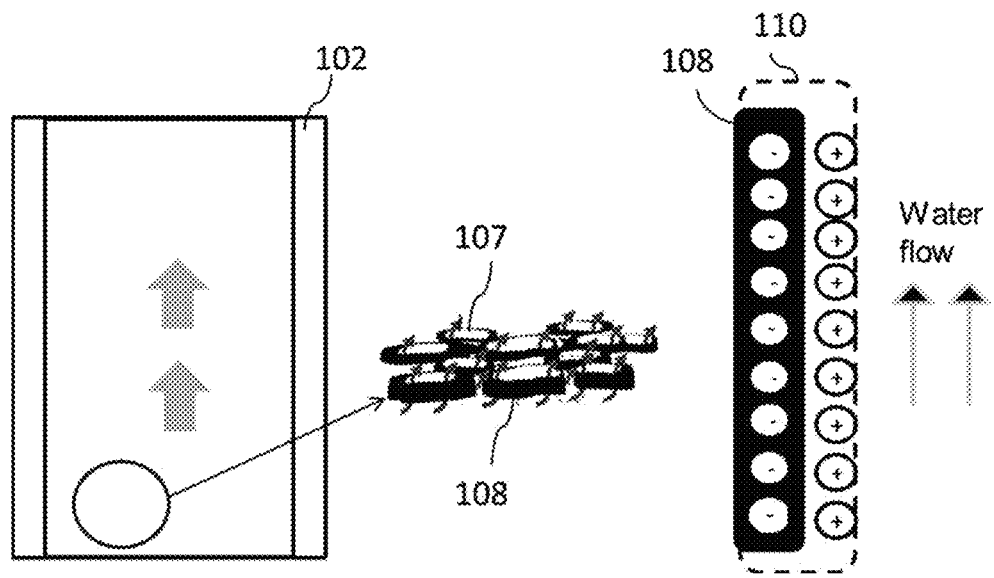
FIG. 1B illustrates the electric double layer (EDL) formed on the carbon particle-water interfaces due to flow of fluid by capillary action in the tubular structure.
Figure 2:
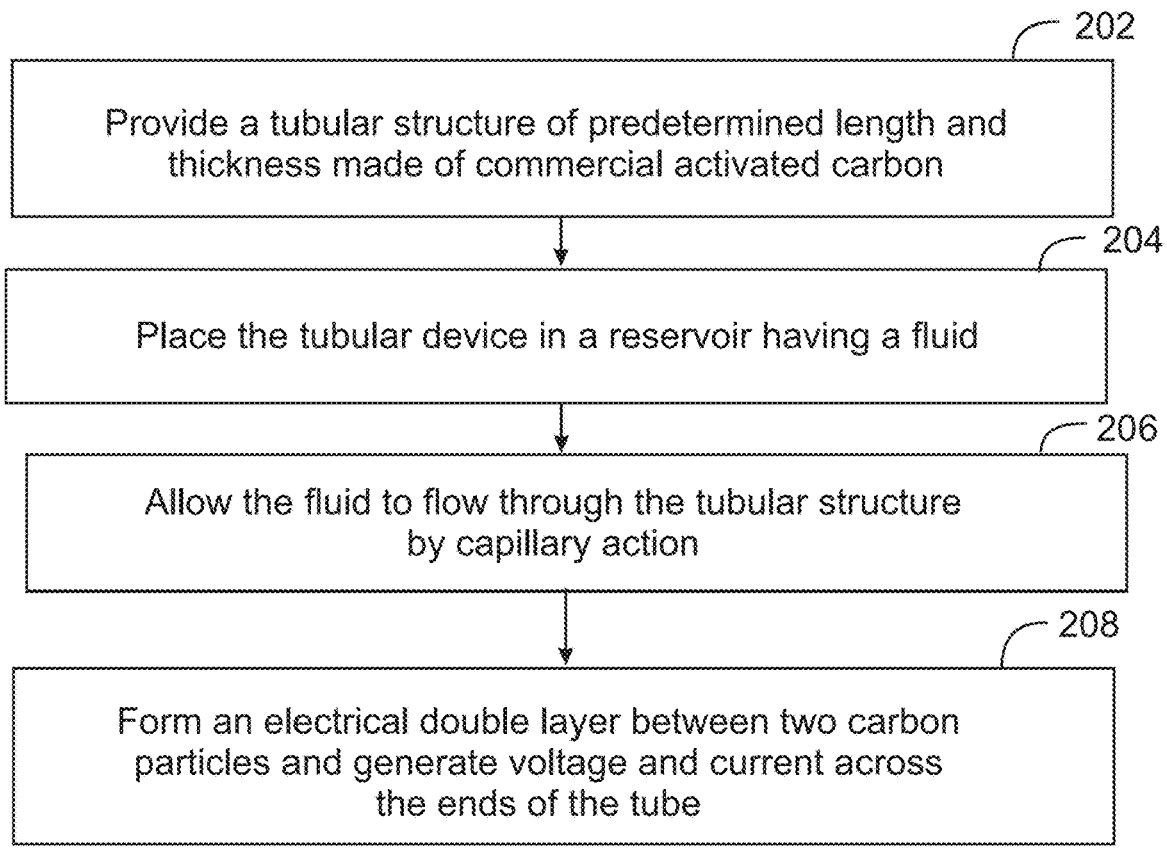
FIG. 2 shows the flow diagram of the method of generating voltage and current from a hydro-voltaic device.

In various embodiments an electrical double layer (EDL) 110 is formed due to the interaction of carbon with water, at the carbon particle-water interfaces as illustrated in FIG. 1B. The TAC has one or more functional groups, especially carboxylic groups and —OH groups. In various embodiments, the one or more functional groups attaches with $H^+$ in water, and create the EDL layer 110. The EDL layer leads to a potential generation. The EDL layer 110 and the movement of charges are illustrated in FIG. 1B illustrating pores 107 in the porous carbon structure 108. In one embodiment, the gradient of the functional groups along the direction of fluid flow generates the voltage across the system.

In various embodiments the carbon-water interaction and thereby the voltage of the tubular hydro-voltaic device 100 is proportional to the quantity of activated porous carbon material 108 present in the tubular structure 102, up to an optimum value. This means as the quantity of activated porous carbon material 108 decreases from this optimum value, the carbon-water interaction reduces, hereby leading to reduction in the output voltage.

In various embodiments the voltage in the tubular hydro-voltaic device 100 is proportional to the length of the tubular structure 102, the thickness of the tubular structure 102, the tubular diameter of the structure or the quantity of activated porous carbon material 108. In various embodiments, the device has predetermined dimensions of length 30-80 mm×tubular diameter 8-15 mm×thickness of 1-2 mm. In one embodiment the current and voltage generated are a maximum at a predetermined length. In another embodiment the current and voltage are a maximum at a predetermined thickness of the tubular structure 102. In one embodiment, the current and voltage generated are a maximum at a predetermined tubular diameter of the structure 102. In various embodiments the predetermined thickness of the tubular structure 102, is 1.5±0.2 mm. In various embodiments the predetermined length of the tubular structure 102, is 50±2 mm. In some embodiments, the predetermined tubular diameter is 10±0.5 mm. In some embodiments, as the dimensions of the tubular structure deviate from the predetermined value, the carbon fluid interaction reduces, thereby leading to reduction in the output voltage. In various embodiments, the device is configured to produce voltages in the range 0.6 V to 1 V. In various embodiments, the device is configured to generate currents of 0.6 mA or more per device at a given voltage.

In various embodiments, the tubular structure is configured to have a mesoporous structure with pores in the size range 2 and 20 nm. In various embodiments, as the thickness of the tubular structure 102 increases from the predetermined thickness, the capillary action reduces which in turn reduces the output voltage and as the length of the tubular structure 102 increases from the predetermined length the capillary action decreases due to long tube effect, which in turn reduces the output voltage.

In one embodiment, the device is configured to generate enhanced voltage on solar irradiation. A light source is provided to the tubular hydro-voltaic device 100. The power generated by the tubular structure has a slightly enhanced effect during light ON condition. In various embodiments two or more tubular hydro-voltaic devices 100 are connected in series to get a combined output voltage.

In various embodiments, a method 200 of generating voltage and current in a hydro-voltaic device is disclosed. The method in step 202 includes providing a tubular device of predetermined length 30-80 mm×tubular diameter 8-15 mm×thickness of 1-2 mm. The tubular structure is made of activated carbon, and is provided with electrodes at either end thereof. In step 204 the tubular structure is placed in a reservoir comprising a fluid. This allows the fluid to flow through the tubular structure by capillary action in step 206. In various embodiments the fluid may be water or other polar fluid. In step 208 an electrical double layer (EDL) is formed at carbon particle-water interfaces in the tubular structure. The EDL is formed by the attachment of functional groups in TAC, especially carboxylic groups and —OH groups, with $H^+$ in water. This leads to the generation of voltage and causing flow of current across the ends of the tubular structure. In some embodiments, the method may include an additional step of exposing the tubular structure to light to enhance the voltage generated. In some embodiments, the method may comprise maintaining an acidic pH of the water, thereby enhancing the voltage and current drawn from the device In various embodiments, the generated voltage and current is a function of the thickness of the tubular device, the length of the tubular device, or a combination thereof. In various embodiments the tubular structure is of any cross section such as circular, oval, or polygonal. The device has potential to provide power at remote locations, as a device of size 50 mm length×10 mm diameter×1.5 mm thickness is capable of generating mA level currents at 0.85 V or more, as illustrated in the examples.

The advantages of the system include, economic significance generating high voltage and current with less expensive activated carbon, and the device may be easily manufactured without adding any chemically based materials or mechanical treatments, the device is environment friendly because no chemicals were added for fabrication, and is recyclable. Also, the device generates current and voltage irrespective of the position of the light source and at anytime of the day.

EXAMPLES

Example 1: Fabrication of TAC HV and Characterization

The tubular structure with three different thickness (1 mm, 1.5 mm, 2 mm) with the same length (5 cm) TAC were fabricated to analyse the significance of carbon-water interaction and were named as TAC1, TAC1.5, and TAC2. The TAC was fabricated by stacking activated carbon procured from "Green Dust Bio Process Engineer, Coimbatore, Tamil Nadu" in a cylindrical tube having 5 cm length and diameter of 1 cm. The activated carbon was produced from coconut shell and activated with KOH. The working electrode and counter electrode were aluminium metal foil.

Figure 3A:
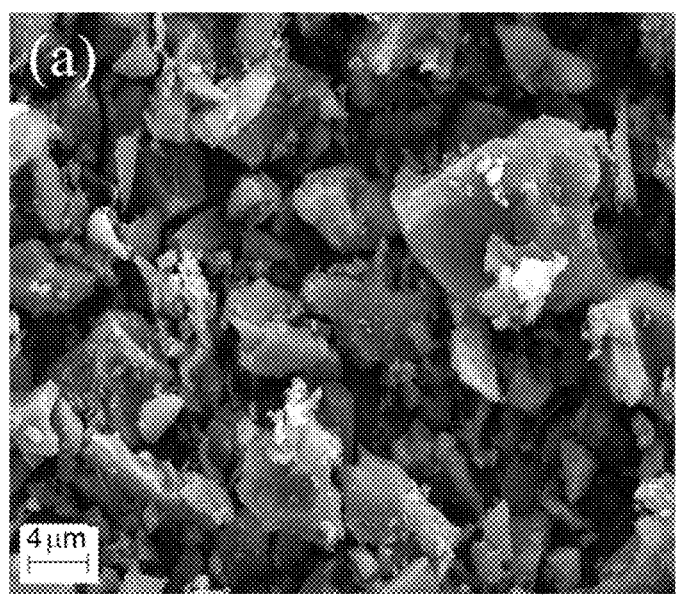
FIG. 3A illustrates the output voltage of a tubular structure of thickness 1 mm, 1.5 mm, and 2 mm (TAC1, TAC1.5, TAC2).
Figure 3B:
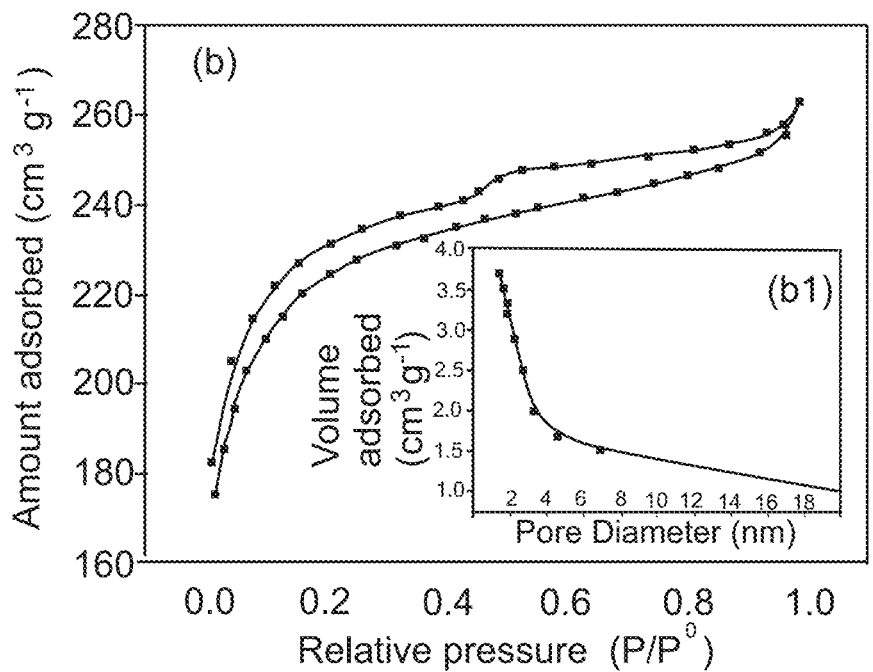
FIG. 3B illustrates the output voltage of a tubular structure of length 4 cm, 5 cm, and 6 cm (TAC4, TAC5, TAC6).

The tubes were characterized using SEM and BET analysis. The SEM image in FIG. 3A indicates that the activated carbon has a granule-like structure containing high interfacial surface. Further, for TAC, the stack of activated carbon inside the tube increases the surface contact between nearby granules, further increasing the water uptake ability. Moreover, the EDL phenomena largely depend on the number of pores and the size of the surface area. So, BET analysis is a much-needed technique to evaluate the porous structure of the carbon. Popularly, the porous structure was created by an activation process having four stages in pore development. FIG. 3B shows the nitrogen adsorption-desorption isotherm of the activated carbon prepared by potassium hydroxide (KOH) activation. The obtained curve denotes the Type IV isotherm based on the International Union of Pure and Applied Chemistry classification (IUPAC). Type IV isotherms possess a characteristic hysteresis loop with condensation in the mesopores, limiting uptake at high relative pressure. Inset in FIG. 3B, 3b1, shows that the pore size range between 2 and 20 nm, indicating the particles' mesoporosity.

Figure 3C:
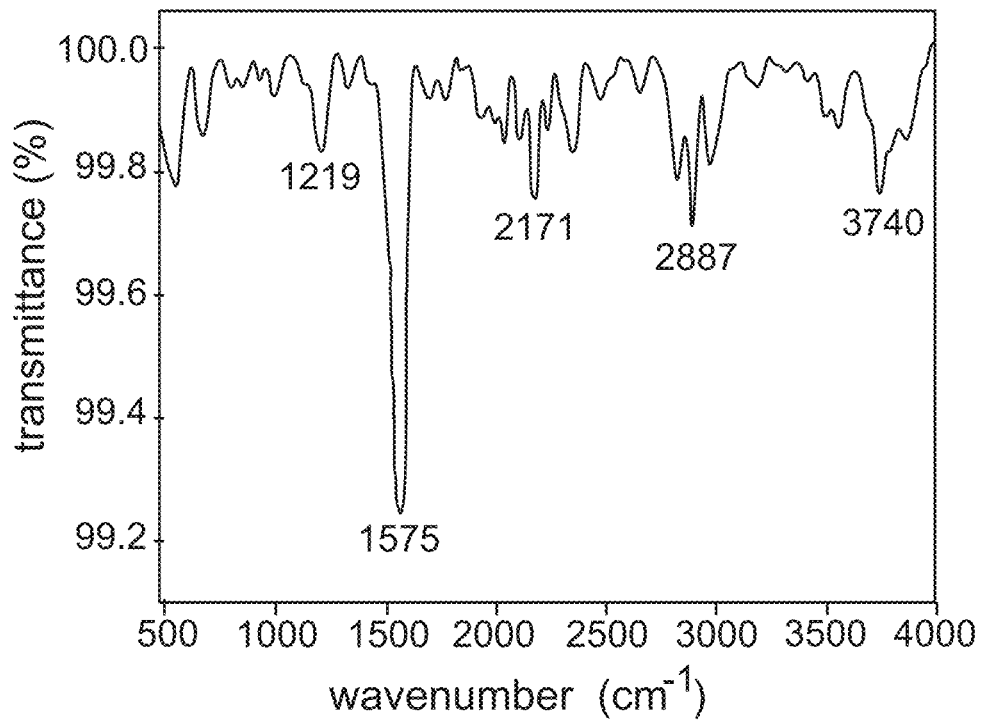
FIG. 3C illustrates the output current of a tubular structure of length 4 cm, 5 cm, and 6 cm (TAC4, TAC5, TAC6).

Fourier Transform Infrared Spectroscopy study shown in FIG. 3C, revealed peaks at 1219 $cm^{-1}$ indicating the less intense vibration of carbon-carbon (C=C) double bond, 1575 $cm^{-1}$ the high intensive peak of graphitic carbon vibration, 2171 $cm^{-1}$, indicating weak vibration of C—O bending vibration, 2887 $cm^{-1}$ due to the presence of OH group of alcohols, and 3740 $cm^{-1}$ indicating carboxylic acids, respectively. These functional groups of activated carbon enhance the hydrophilic nature, which motivates the capillary action for high carbon-water interaction. Reports in the literature suggest that voltage is developed during the interaction of C=O=C functional groups. Thus, the evidence of FTIR reveals the high existence of such functional groups, which may be key to creating potential difference when interacting with water molecules.

Example 2: Performance of the Device Under Various Conditions

From the current and voltage measurements, TAC1.5, i.e. tube with thickness of 1.5 mm gave the maximum result. Therefore, we selected this device for further experiments. Three different length tubes (4 cm, 5 cm, 6 cm) with the same thickness TAC1.5 devices were also constructed to confirm the capillary rise and mentioned as TAC4, TAC5, and TAC6, respectively. The results are shown in FIG. 4A-FIG. 4D.

Figure 4A:
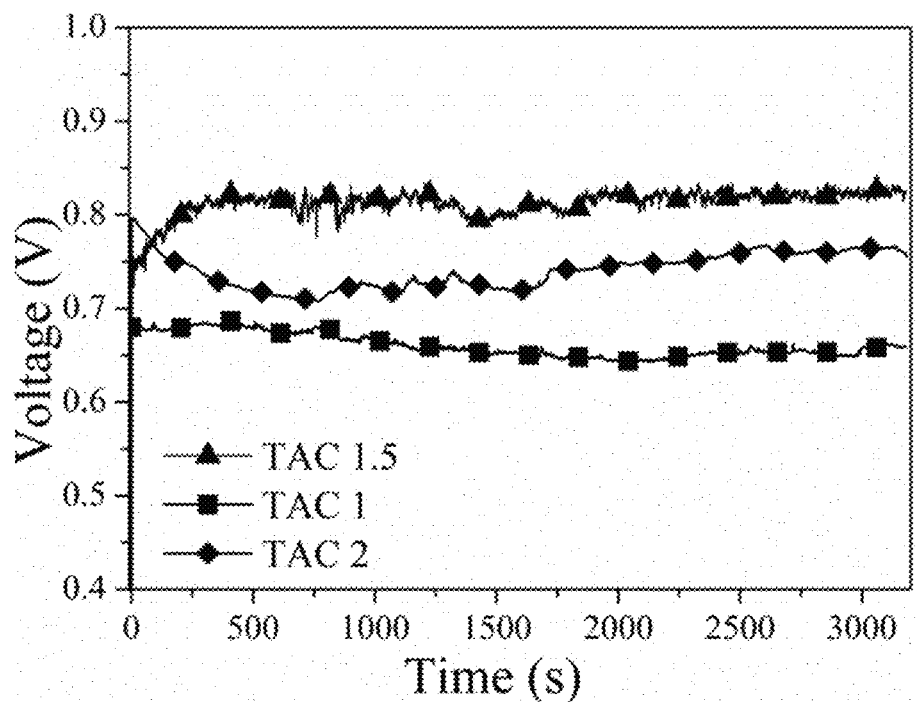
FIG. 4A illustrates the sudden change in voltage of tubular structure of length 5 cm (TAC5) device during dry condition and wet condition.
Figure 4B:
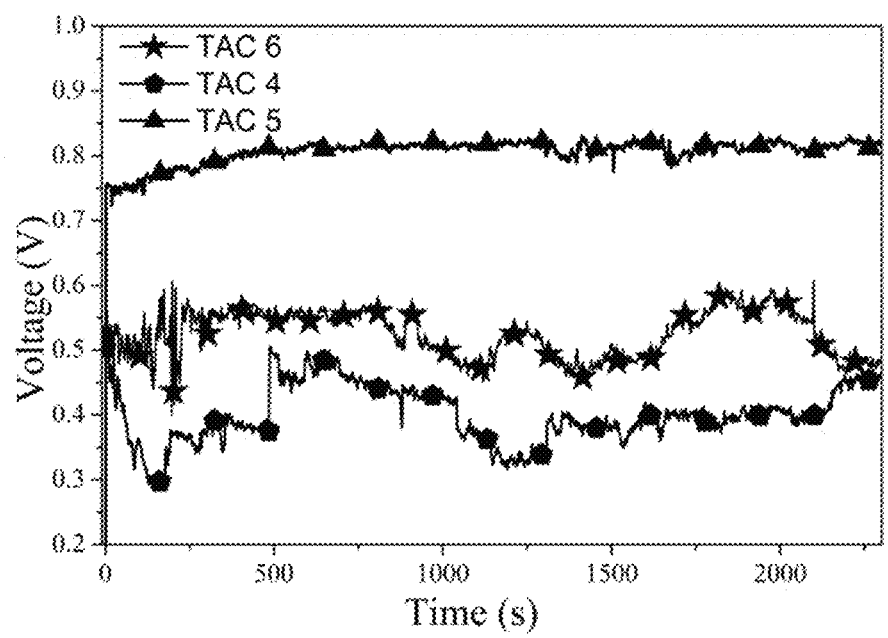
FIG. 4B illustrates variation in current of tubular structure of length 5 cm (TAC5) device during dry condition and wet condition.
Figure 4C:
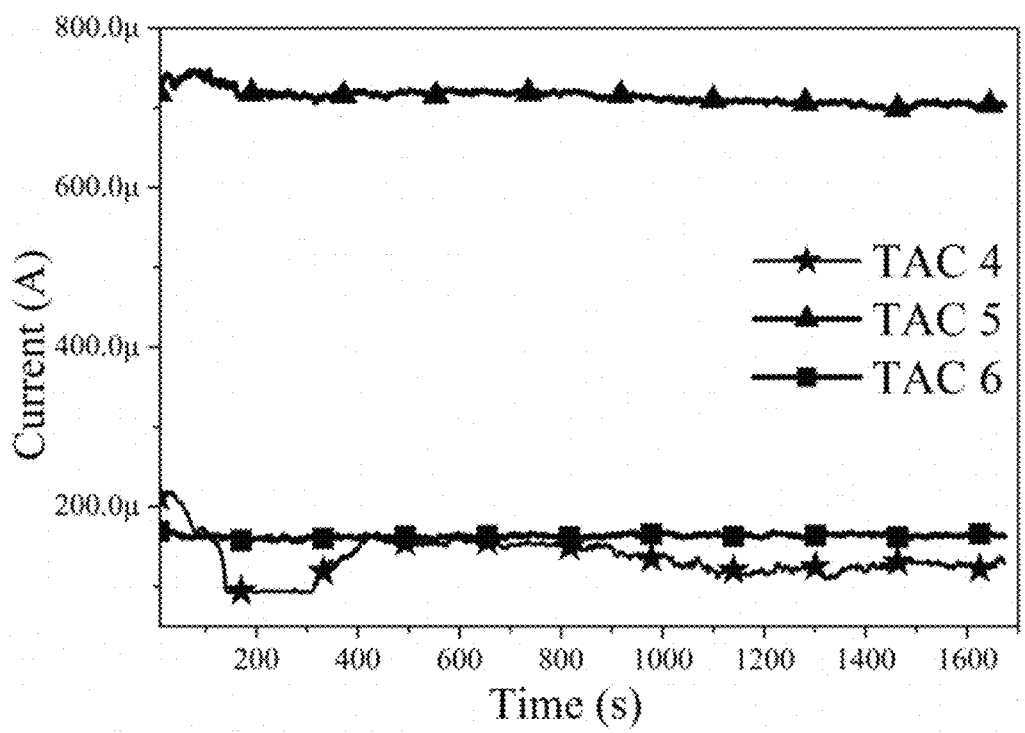
FIG. 4C illustrates voltage generation using various hydrophilic carbon materials.
Figure 4D:
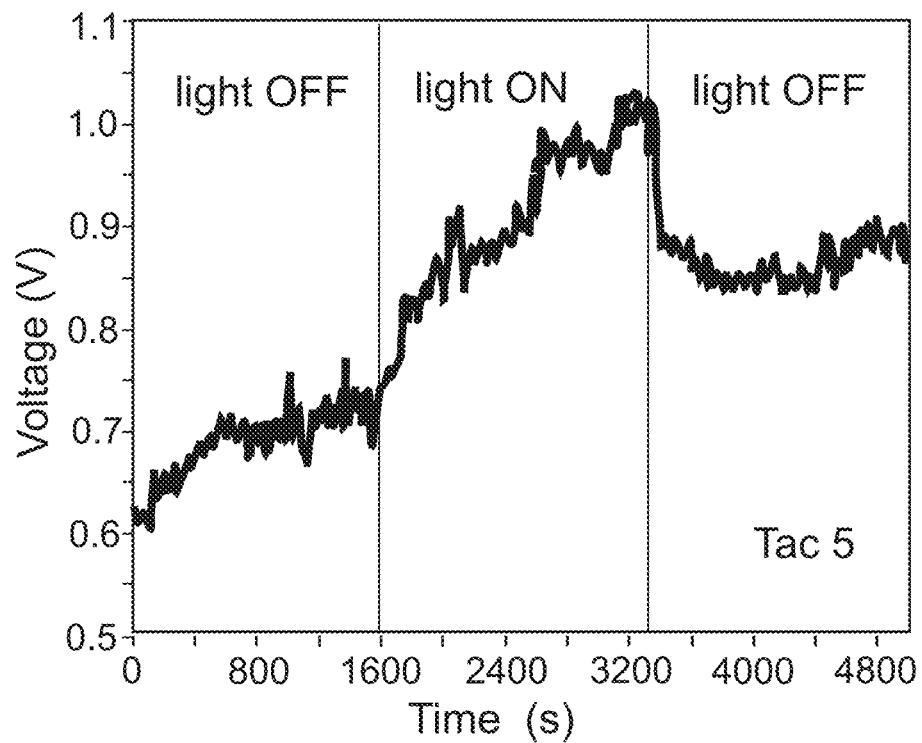
FIG. 4D illustrates the output voltage during light off condition of the tubular structure of length 6 cm (TAC6).

Output voltage of TAC1, TAC1.5, TAC2 is shown in FIG. 4A. Here, the TAC1.5 device shows the maximum output voltage 0.8 V for a long time, whereas TAC1, TAC2 shows less output. The reduction in output voltage of TAC1 is due to less carbon content leading to less carbon-water interaction whereas TAC2 shows the high thickness leading to less capillary action. FIG. 4B shows the output voltage of TAC4, TAC5, and TAC6 with same thickness. The device TAC5 gave the best voltage about 0.8 V due to the better capillary action whereas, TAC4 device gave a good capillary rise, but less carbon content, resulted in a lower voltage. In TAC6 voltage reduction is due to long tube effect which affects the capillary action. FIG. 4C shows the electric current from the three different length devices. The effect of light irradiation on the TAC5 device output is shown in FIG. 4D. During ambient condition, the TAC5 device showed the voltage 0.7 to 0.8 V for 1200 seconds, and it was raised to 1.02 V during light ON. After switching OFF the light, voltage was slow down to 0.85 V.

Figure 5A:
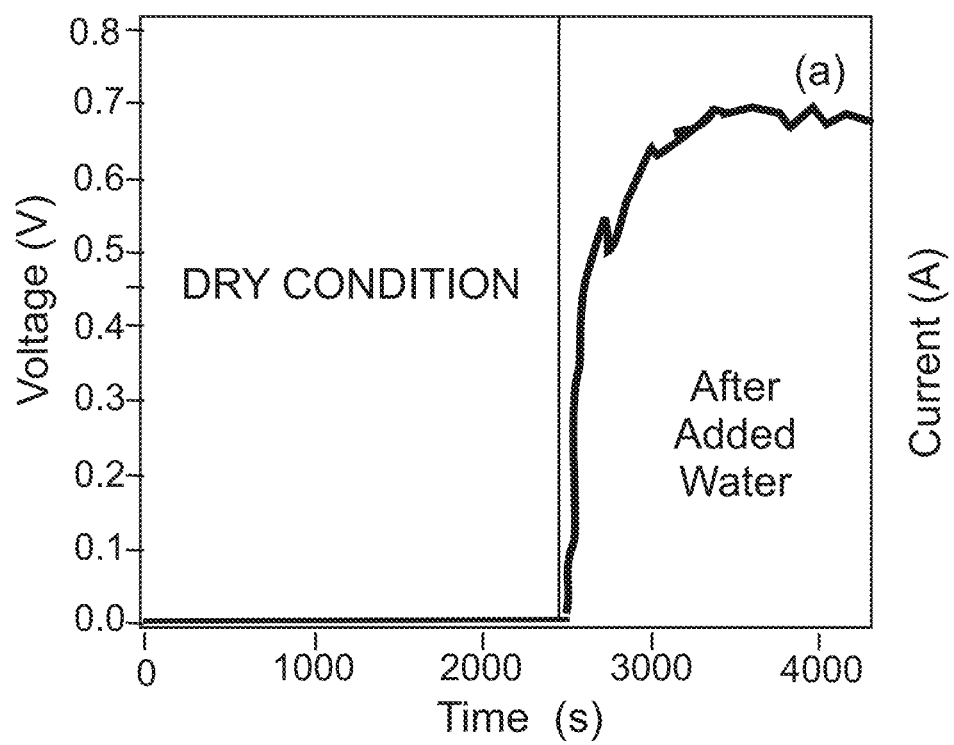
FIG. 5A is a graph of voltage vs. time.
Figure 5B:
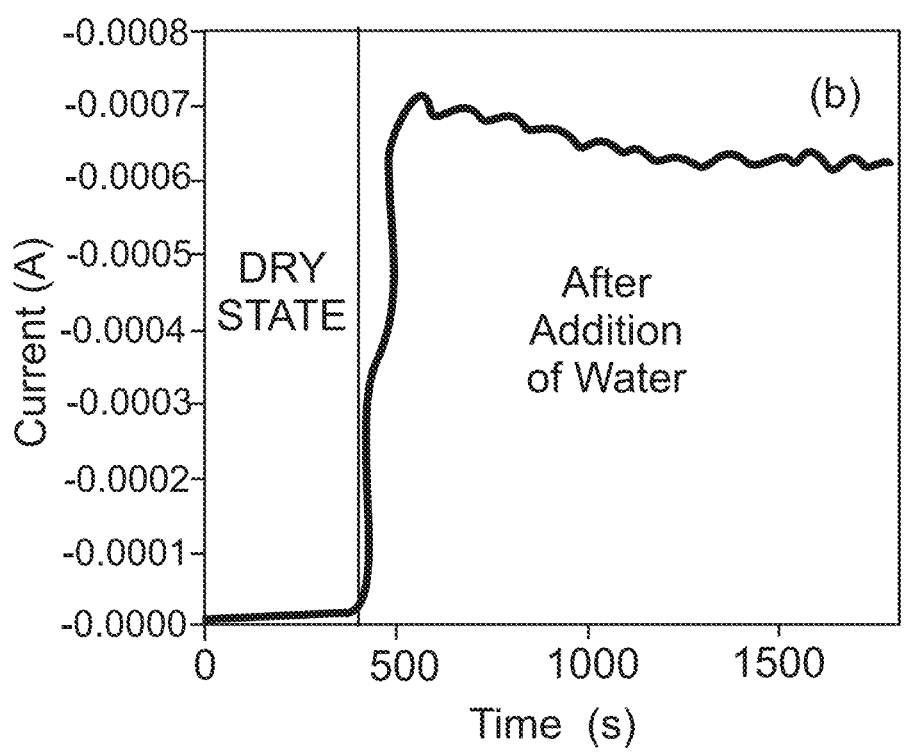
FIG. 5B is a graph of current vs. time.
Figure 5C:
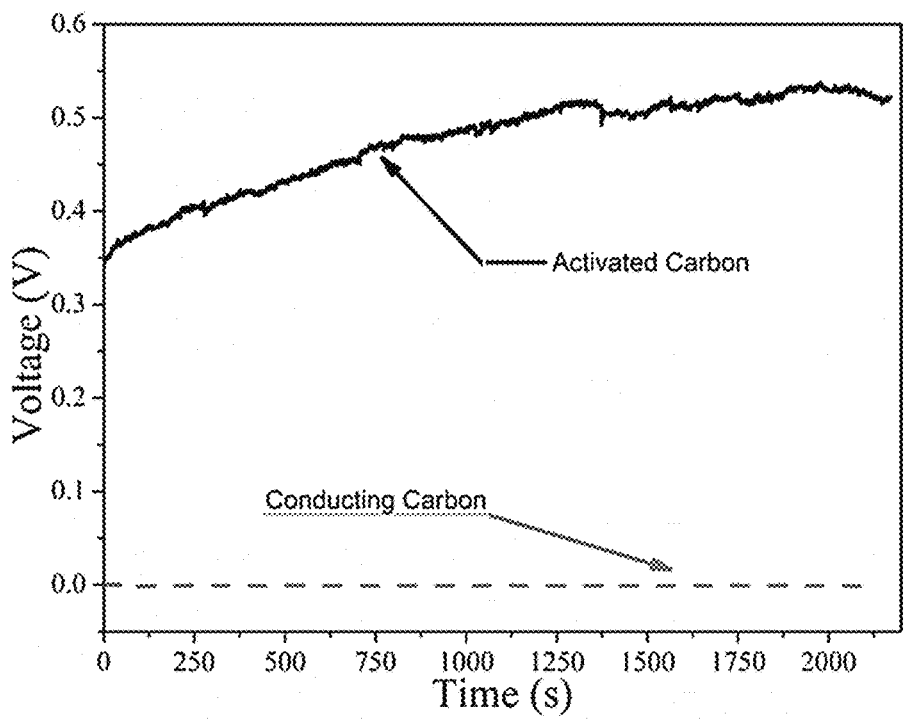
FIG. 5C is another graph of voltage vs. time.
Figure 5D:
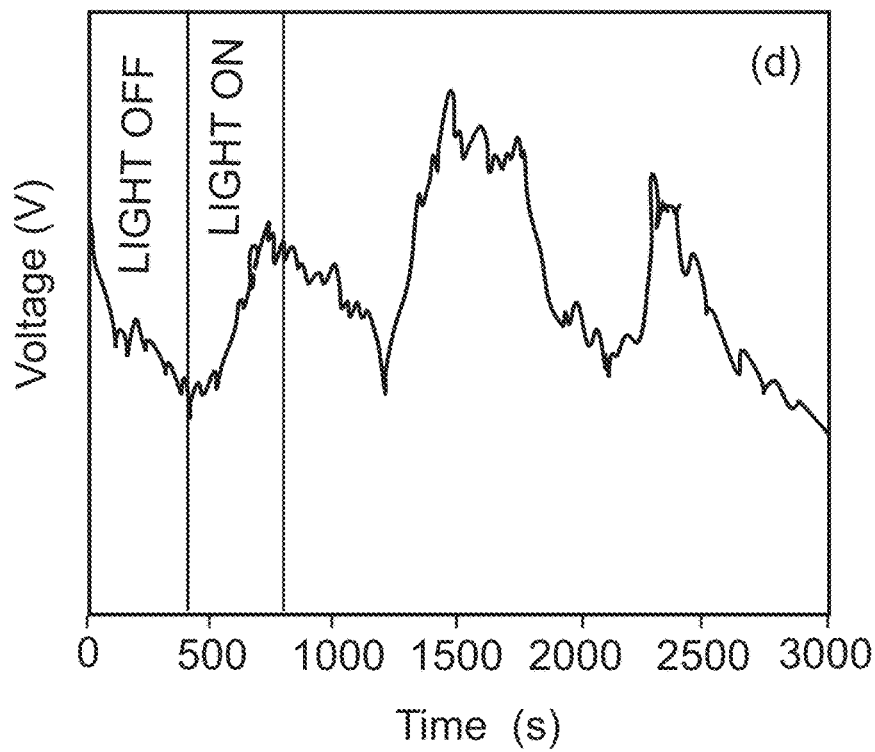
FIG. 5D is another graph of voltage vs. time.

To further confirm the water molecules-carbon interaction as the origin for current and voltage generation, dry state and wet state of TCA was studied. FIG. 5A, confirms this as TAC shows zero voltage for up to 2500 seconds during dry state (without adding water) and suddenly rises to 0.7 V by the addition of water. The results once again proving the carbon-water interaction leads to the voltage generation. Second, the induced current with and without water also has been verified and it was shown in the FIG. 5B. From these two graphs, generation of voltage from a device takes a time to attain maximum output in the range of 300 s-500 s. This is the actual time of water pumping rate through the device. The result indicating an electro kinetic effect during the capillary action inside the tube, which leads to streaming potential. Different morphological hydrophobic carbon sample was taken. Carbon Black (CB) is a carbon-based material which is highly hydrophobic in nature. This was taken to understand the effect of carbon-water interaction by loading the CB instead of activated carbon in the tubular hydro-voltaic device. As anticipated, no voltage/current was developed during the load of CB, because of its high hydrophobic property, i.e. water would not rise to top by capillary action and it was shown in the FIG. 5C. With activated carbon, the device shows voltage more than 0.5 V whereas using CB, the voltage drops to 0.017 mV. This is the solid proof of conclusion indicating the water pumping through porous carbon materials can build a potential. Next, to conclude the effect of light for power generation, voltage was measured during light ON and OFF condition. Generally, we know the evaporation can enhance by supplying light. However, due to the tube-like structure of TCA, light absorbing area is small. By increase the surface area, light absorption can be enhanced, but it will affect the pumping rate. Thus, light plays a small role here for TAC devices and it was shown in the FIG. 5D. Voltage has been enhanced during light ON condition and reduced (not to zero) when light OFF. This cyclic behaviour also specifying the voltage has been developed under ambience condition and boosted when an external light energy comes to play. Under room temperature and humidity, TAC can provide more than 0.7 V constantly for a long time. This confirms the water evaporation because of ambient temperature is necessary for power generation.

To confirm the practical application of TAC device, four devices were connected in series to add up the voltage to use it in a practical application. Four devices such as two TAC1, TAC1.5 and TAC2 were connected in a series circuit. The obtained 2.5 V from the devices, sustained for more than 10 days under ambient room condition. Here also, we have confirmed the negligible effect of light during the series connection. Initially, the light was exposed to devices, but the voltage stays the same even after the removal of light. Furthermore, 10 devices were connected in series to summate the voltage for large input devices. We obtained continuous 5.95 V output for a long time. Hence, the carbon-water interaction plays a critical role for the generation of voltage even in less evaporation.

Figure 6A:
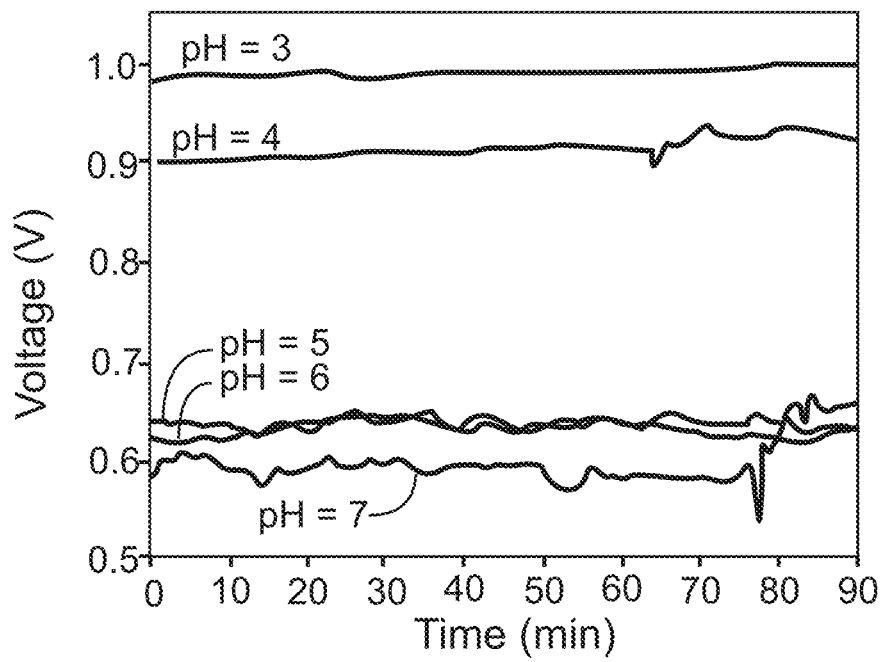
FIG. 6A is another graph of voltage vs. time.
Figure 6B:
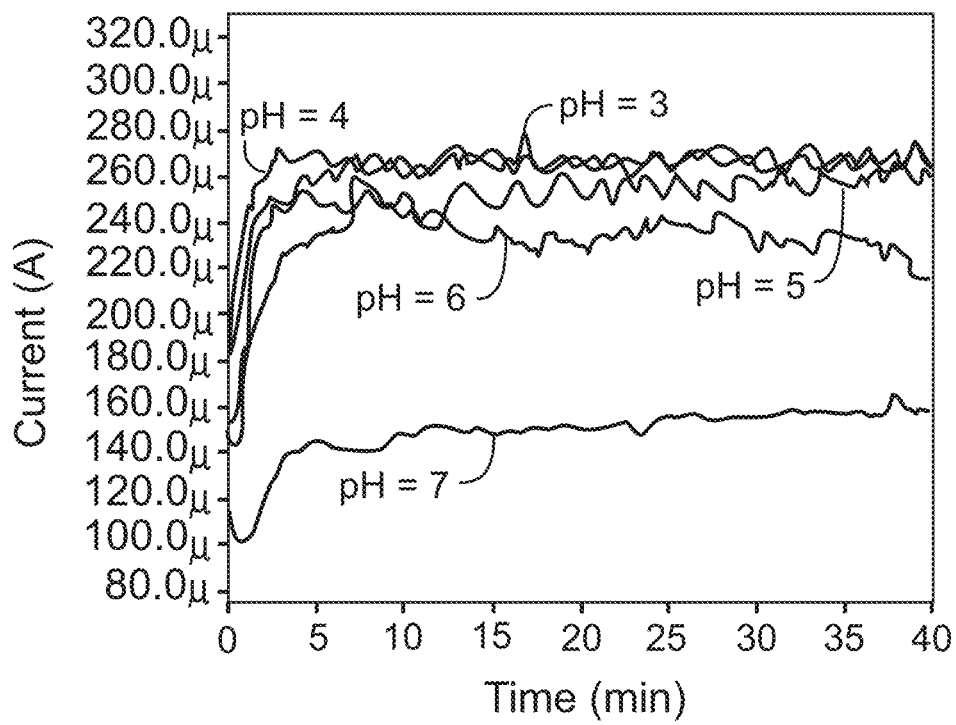
FIG. 6B is another graph of current vs. time.

The effect of pH of the water on voltage generation was studied, since the electrical double layer would be expected to be influenced markedly by hydrogen concentration. We varied the pH value of the fluid by adding the drops of HCl and measured the VOC of the TAC5 device. The observed data is attached in FIGS. 6A and 6B. By changing the pH value of fluid from 7 to 3, the voltage rapidly increased from 0.62 to 1 V. We propose that because of the higher H+ ion concentration at lower pH, which interact with functional groups of activated carbon, there is increased EDL formation in the device, which leads to increase in voltage and current produced, and therefore increased power from the device.

Example 3: Comparison of the Device with Existing Methods, Devices, or Materials The highly efficient tubular hydro voltaic device was manufactured using very less expensive carbon giving a huge option for practical usage. Several research articles from last few years have considered voltage and current production through capillary action, but the materials and fabrication steps were much complicated and expensive. Carbon Nano Tube (CNT) HV devices were popularized due to the high surface area, high thermal/electrical conductivity, flexibility. But the synthesize of CNT as described in "Sustainable Energy & Fuels Carbon Nanotubes", Kumar et al (2022), Sustainable energy & fuels 1141-1147 is complicated and for large scale HV devices, CNT does not bring a complete solution due to high cost. Carbon black was also introduced for HV effects, it is cheap but follows few synthesizing steps as discussed in "Voltage Distribution in Porous Carbon Black Films Induced by Water Evaporation", Zhang et al. *J. Phys. Chem.* C2021, 125 (17), 8959-8964. Moreover, all reported articles observe water evaporation induced HV devices, which is directly indicating the dependency of external energy for evaporation, also the structure of the design is 2D area structure, offering very less carbon-water interaction. Due to these issues, the output current is in few μA. A previous reported patent article showing the generation of power from HV device include several materials and complicated steps during fabrication.

TABLE 1

Comparison of obtained voltage in other reported articles with this work

| Material Used | Obtained Voltage | Published Year/Reference |
|---|---|---|
| Carbon nanotube | 0.370 V/7 μA | 2022 https://doi.org/10.1039/d1se01996a |
| Al$_2$O$_3$ TLC Plates | 0.33 V/0.85 μA | 2022 https://doi.org/10.1021/acsomega.1c04751 |
| Ti$_3$C$_2$T$_x$ | 0.54 V/120 μA (within 30-50 s it reduces to 20-10 μA) | 2022 https://doi.org/10.1039/d1ee00859e |
| Carbon black - Toluene/ethanol soot | 0.7 V | 2021 https://doi.org/10.1021/acs.jpcc.1c01208 |
| ZnO Nanoarray | 0.03 V | 2022 https://doi.org/10.3390/bios12030164 |
| BCP-RGO | 18 mV | 2021 https://doi.org/10.1021/acsomega.0c03717 |

TABLE 1-continued

Comparison of obtained voltage in other reported articles with this work

| Material Used | Obtained Voltage | Published Year/Reference |
| --- | --- | --- |
| Ni—Al Layered Double Hydroxide | 0.7/1.3 μA | 2018 https://doi.org/10.1016/j.nanoen.2018.12.042 |
| This work | 0.85 V/0.72 mA | 2022 |

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope, which should be as delineated in the appended claims.

We claim:

1. A hydro-voltaic device comprising
a tubular structure of activated carbon (TAC) and having a top end, a bottom end, a predetermined length, a predetermined diameter and a predetermined thickness, a first electrode affixed to the top end and a second electrode to the bottom end; and
a reservoir comprising water with the tubular structure in contact therewith, wherein capillary action forms an electric double layer at carbon particle-water interfaces in the tubular structure, thereby generating voltage and current flow between the first electrode and the second electrode.

2. The hydro-voltaic device as claimed in claim 1, wherein the predetermined length is 30-80 mm, the predetermined diameter is 8-15 mm and the predetermined thickness is 1-2 mm.

3. The hydro-voltaic device as claimed in claim 1, wherein the predetermined length is 50±2 mm, or the predetermined diameter is 10±0.5 mm, or the predetermined thickness is 1.5±0.2 mm.

4. The hydro-voltaic device as claimed in claim 1, wherein the device is configured to generate enhanced voltage on optical irradiation.

5. The hydro-voltaic device as claimed in claim 1, wherein the generated voltage is in a range 0.6 V to 1 V.

6. The hydro-voltaic device as claimed in claim 1, wherein the tubular structure comprises activated carbon with mesoporosity in the size range 2 and 20 nm.

7. A method of generating voltage and current in a hydro-voltaic device comprising:
providing a tubular hollow structure comprising activated carbon of predetermined dimensions of 30-80 mm in length, 8-15 mm in diameter, and 1-2 mm in thickness, the structure having electrodes at either end thereof;
placing the tubular structure in a reservoir comprising water;
allowing the water to flow through the tubular structure by capillary action; and
forming an electric double layer (EDL) at carbon particle-water interfaces, thereby generating voltage and causing flow of current across the ends of the tubular structure.

8. The method as claimed in claim 7, comprising the step of exposing the device to a light source to enhance the voltage generated.

9. The method as claimed in claim 7, comprising maintaining an acidic pH of the water, thereby enhancing the voltage and current drawn from the device.

* * * * *